US006692139B2

(12) United States Patent
Kotovsky

(10) Patent No.: US 6,692,139 B2
(45) Date of Patent: Feb. 17, 2004

(54) PLATED LIGHTING METHOD AND APPARATUS

(76) Inventor: Irwin Kotovsky, 3941 California Ave., Pittsburgh, PA (US) 15212

(*) Notice: Subject to any disclaimer, the term of this patent is extended or adjusted under 35 U.S.C. 154(b) by 0 days.

(21) Appl. No.: 10/093,811

(22) Filed: Feb. 22, 2002

(65) Prior Publication Data

US 2003/0161157 A1 Aug. 28, 2003

(51) Int. Cl.[7] .......... F21V 11/00; B60Q 1/00

(52) U.S. Cl. .......... 362/368; 362/372; 362/362; 362/147; 362/404; 362/426

(58) Field of Search .......... 362/362, 368, 362/147, 404, 426, 372

(56) References Cited

U.S. PATENT DOCUMENTS

| | | | | | |
|---|---|---|---|---|---|
| 3,581,080 | A | * | 5/1971 | Magi | 362/362 |
| 4,011,444 | A | * | 3/1977 | Levy | 362/311 |
| 4,881,157 | A | * | 11/1989 | Pahl | 362/371 |
| 4,956,753 | A | * | 9/1990 | Renfrew | 362/493 |
| 5,136,489 | A | * | 8/1992 | Cheng et al. | 362/294 |
| 5,251,118 | A | * | 10/1993 | Budnovitch et al. | 362/362 |
| 5,581,448 | A | * | 12/1996 | Harwood | 362/147 |
| 6,234,644 | B1 | * | 5/2001 | Kotovsky et al. | 362/148 |
| 6,290,375 | B1 | * | 9/2001 | LeVasseur | 362/368 |
| 6,364,511 | B1 | * | 4/2002 | Cohen | 362/368 |

* cited by examiner

*Primary Examiner*—Sandra O'Shea
*Assistant Examiner*—James W Cranson, Jr.
(74) *Attorney, Agent, or Firm*—Ansel M. Schwartz

(57) ABSTRACT

An apparatus for lighting a room from the room's ceiling. The apparatus includes a first plate having an opening. The apparatus includes a spacer attached to the first plate. The apparatus includes at least a second plate having an opening attached to the spacer and maintained in spaced relationship from the first plate by the spacer. The opening of the first plate and the opening of the second plate together define a first channel. The apparatus includes means for lighting including at least one lamp and one transformer electrically connected to the lamp. The lamp is either a low voltage or line voltage lamp. The lamp extends into the channel. A method for forming a lighting apparatus. A method for lighting a room.

16 Claims, 6 Drawing Sheets

PLATED LIGHTING METHOD AND APPARATUS

FIELD OF THE INVENTION

The present invention is related to a lighting apparatus having a plurality of plates in spaced relationship that can be made from a multitude of different materials. More specifically, the present invention is related to a lighting apparatus for low voltage or line voltage lamps that can be made having a plurality of plates in spaced relationship out of a multitude of different materials.

BACKGROUND OF THE INVENTION

Lights have always been a functional necessity in any enclosure from the time they were first available. Besides the light providing a necessary function to allow people to see inside an enclosure, the lights themselves have at times taken on an esthetic or artistic quality to better enhance the environment in which they are placed. The present invention furthers this ascetic or artistic quality by allowing the apparatus for lighting to be able to be of a multitude of different materials depending on the aesthetic environment in which they are found and which the architect or designer wishes to enhance or create.

SUMMARY OF THE INVENTION

The present invention pertains to an apparatus for lighting a room from the room's ceiling. The apparatus comprises a first plate having an opening. The apparatus comprises a spacer contacting the first plate. The apparatus comprises at least a second plate having an opening contacting the spacer and maintained in spaced relationship from the first plate by the spacer. The opening of the first plate and the opening of the second plate together define a first channel. The apparatus comprises means for lighting including at least one lamp and one transformer electrically connected to the lamp. The lamp is either a low voltage or line voltage lamp. The lamp extends into the channel.

The present invention pertains to a method for forming a lighting apparatus. The method comprises the steps of contacting a spacer to a first plate with a hole. There is the step of contacting a second plate having a hole to the spacer to maintain the second plate in parallel and spaced relationship with the first plate so the holes of the first and second plates form a first channel. There is the step of connecting a lamp socket adjacent the first plate to a transformer adjacent to a canopy for either a low voltage or a line voltage lamp.

The present invention pertains to a method for lighting a room. The method comprises the steps of attaching a plurality of plates in spaced relationship and in parallel to each other to a ceiling. Each plate has a hole, and the holes of the plurality of plates together define a first channel. There is the step of introducing a low voltage or a line voltage lamp into a lamp socket connected to a transformer adjacent the first plate so the lamp is disposed in the first channel.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
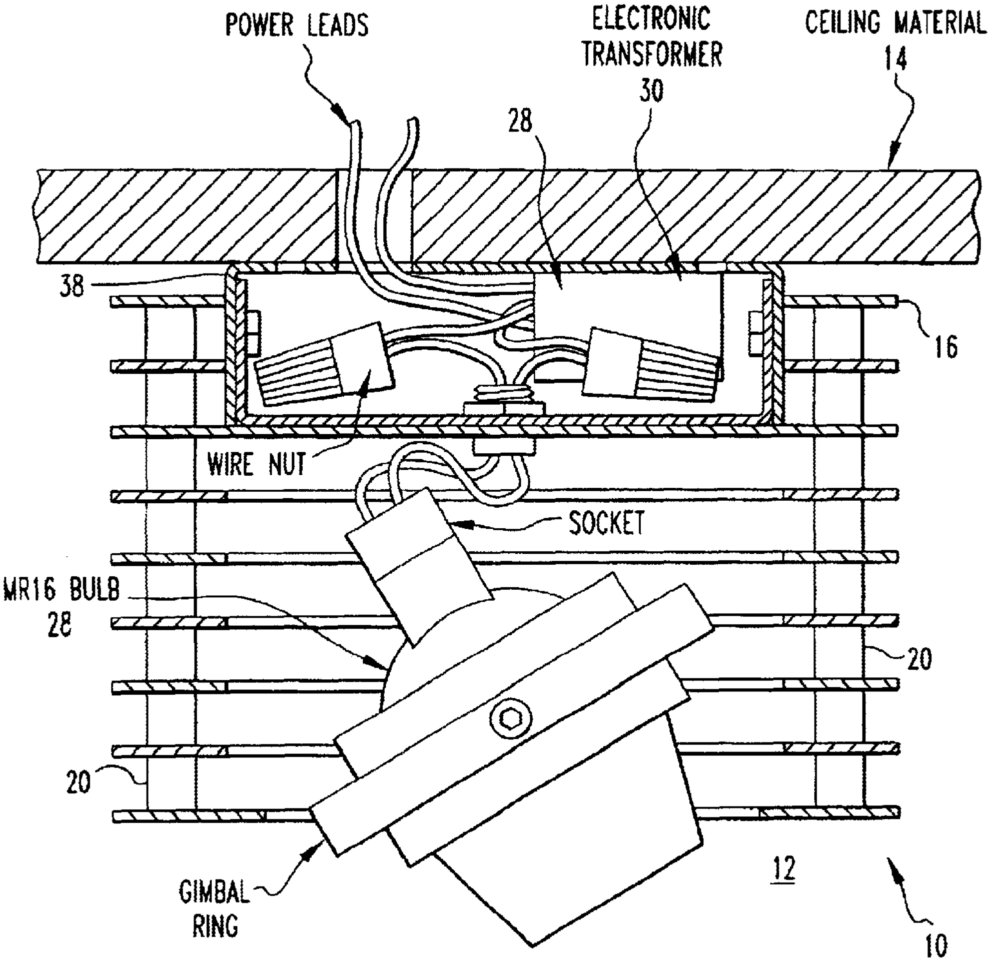
FIG. 1 is a schematic representation of a cross-sectional view of a one lamp apparatus of the present invention.
Figure 2:
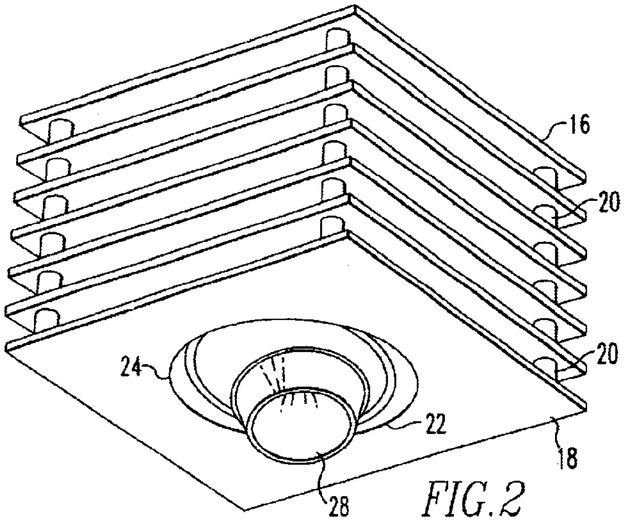
FIG. 2 is a schematic representation of one lamp square apparatus of the present invention.
Figure 3:
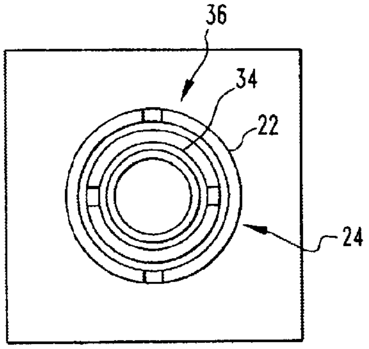
FIG. 3 is a schematic representation of a bottom view of the one lamp square apparatus of the present invention.
Figure 4:
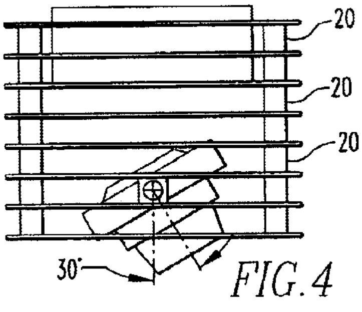
FIG. 4 is a schematic representation of a side view of the one lamp square apparatus of the present invention.
Figure 5:
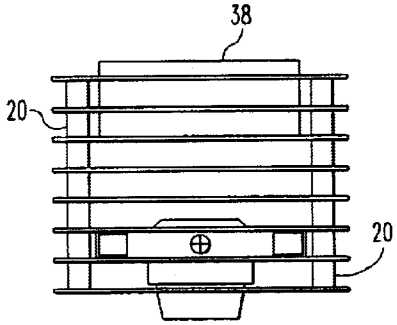
FIG. 5 is a schematic representation of a front view of the one lamp square apparatus of the present invention.

Referring now to the drawings wherein like reference numerals refer to similar or identical parts throughout the several views, and more specifically to FIGS. 1–5 thereof, there is shown an apparatus 10 for lighting a room 12 from the room's 12 ceiling 14. The apparatus 10 comprises a first plate 16 having an opening. The apparatus 10 comprises a spacer 20 contacting the first plate. The apparatus 10 comprises at least a second plate 18 having an opening contacting the spacer 20 and maintained in spaced relationship from the first plate 16 by the spacer 20. The opening of the first plate and the opening of the second plate 18 together define a first channel 24. The apparatus 10 comprises means for lighting including at least one lamp 28 and one transformer 30 electrically connected to the lamp 28. The lamp 28 is either a low voltage or line voltage lamp 28. The lamp 28 extends into the channel.

Figure 6:
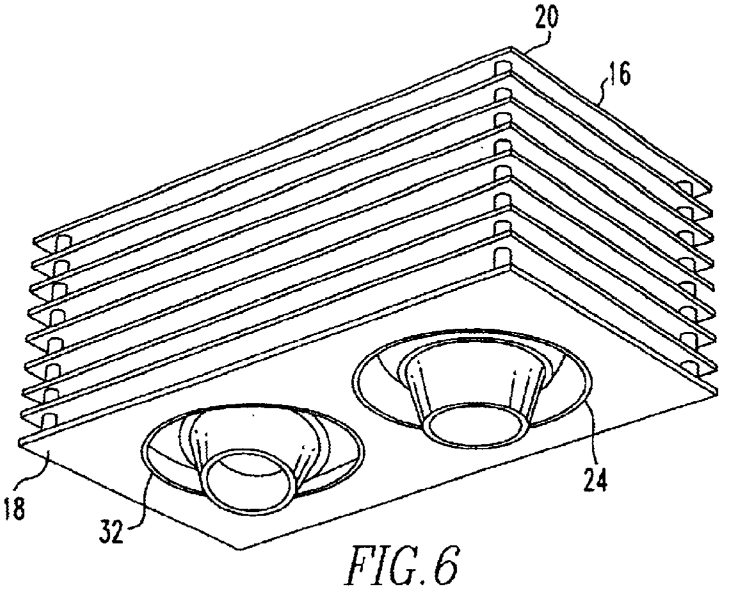
FIG. 6 is a schematic representation of a two lamp rectangular apparatus of the present invention.

Preferably, each plate is made of metal, plastic, glass, marble or synthetic. Each plate is preferably square, round, rectangular, triangular, octagonal, elliptical or oval. Preferably, the spacer 20 can be hollow or solid and made of metal, plastic, wood, marble or synthetic or be magnetic. The first plate 16 and the second plate 18 preferably each have a second hole 32 which together define a second channel, and the lighting means 26 includes a second lamp 28 disposed in the second channel, as shown in FIG. 6.

Preferably, the lighting means 26 includes a yoke 34 which holds the lamp 28. The lighting means 26 preferably includes a gimbal 36 ring assembly having the yoke 34 for holding the lamp 28. Preferably, the lamps 28 are regressed, flush or protruding with respect to the second plate 18. The first and second plates 16, 18 are preferably surface mounted, suspended, semi-recessed, or recessed from the ceiling 14 or wall mounted.

Preferably, the transformer 30 is integral or remote from the first plate 16. The transformer 30 is preferably attached or detached adjacent the first plate 16. Preferably, the lighting means 26 includes a lamp 28 socket for holding the first lamp 28. The lamp 28 socket is preferably candelabra based, intermediate based, medium based, mogel based or bayonet based. Preferably, the first lamp 28 is contained in an eyeball-pull down bracket that permits vertical movement of the lamp 28.

The present invention pertains to a method for forming a lighting apparatus 10. The method comprises the steps of contacting a spacer 20 to a first plate 16 with a hole 22. There is the step of contacting a second plate 18 having a hole 22 to the spacer 20 to maintain the second plate 18 in parallel and spaced relationship with the first plate 16 so the holes 22 of the first and second plates 16, 18 form a first channel 24. There is the step of connecting a lamp 28 socket adjacent the first plate to a transformer 30 adjacent to a canopy 38 for either a low voltage or a line voltage lamp 28.

The present invention pertains to a method for lighting a room 12. The method comprises the steps of attaching a plurality of plates in spaced relationship and in parallel to each other to a ceiling 14. Each plate has a hole 22, and the holes 22 of the plurality of plates together define a first channel 24. There is the step of introducing a low voltage or a line voltage lamp 28 into a lamp 28 socket connected to a transformer 30 adjacent the first plate 16 so the lamp 28 is disposed in the first channel 24.

Preferably, the attaching step includes the step of attaching a canopy 38 to the ceiling 14, the plurality of plates adjacent to the canopy 38.

In the operation of the invention, a first plate 16 having a hole 22, has spacers 20 placed at each of its corners on the same side of the first plate 16, if it is a rhombohedron shape, or at equidistant locations along its edge if it is elliptical or round shaped. The plates can have openings through which rods extend. The rods are placed through the openings in the first plate. Hollow spacers are then placed on the rods and moved down to contact the first plate. Alternatively, individual spacers, hollow or solid, can be glued or clipped to the first plate, and the plate does not necessarily have any openings. The actual choice of the locations of the spacers 20 to maintain the plates apart, but in spaced relationship and in parallel, is the choice of the builder. A second plate 18 having a hole 22 and openings is placed on the spacers 20, preferably through the rods, that extend from the first plate 16 so the hole 22 of the second plate 18 aligns with the hole 22 of the first plate 16, and ideally, the circumference of the second plate 18 aligns with the circumference of the first plate 16. The second plate 18 contacts the spacers 20 that extend from the first plate 16. If additional plates are desired, then this process is repeated in regard to the second plate 18, where spacers 20 are then placed on the second plate 18 in alignment with the spacers 20 between the first and second plates 16, 18 on the side of the second plate 18 that is not facing the first plate 16. Again, if desired, the spacers 20 do not have to align as they extend from the second plate 18 with the spacers 20 that are disclosed between the first and second plates 16, 18. A third plate then contacts the spacers 20 extending from the second plate 18 away from the first plate 16, preferably through the rods, with the hole 22 of the third plate in alignment with the hole 22 of the second plate 18, and thus the first plate 16. This process of adding plates is repeated, as desired, until the number of plates needed has been reached. There is essentially no limitation on the number of plates used, except for reasonableness for the situation.

On the side of the first plate 16 that faces away from the second plate 18, a canopy 38 is screwed or clipped to the first plate 16. The canopy 38 has a circumference that preferably is smaller than the circumference of the first plate 16, although this is not necessary. Ideally, there are a plurality of plates and the canopy 38 fits into and is hidden by the upper plates of the plurality of plates. In such instance, the holes of the upper plates that form the channel are larger than the holes of the plates that are lower down, and receive the canopy 38.

The canopy 38 serves as a container for gear or transformers 30, as well as the basis to attach the plates to a ceiling 14 of a room 12. The canopy 38 can be screwed, pinned or clipped into the ceiling 14 or attached to the ceiling 14 with straps, as is well known in the art. The light socket in which the lamp 28 is inserted, can electrically connect with the canopy 38 through the channel formed by the holes 22 of the various plates that are attached together. The socket can be attached to an intermediate plate or plates and disposed in the channel by being welded, screwed, clipped or riveted to the plate. Wires from the lamp 28 socket that provide electricity to the lamp 28 extend to the channel up to the canopy 38 to a transformer 30, or beyond if the transformer 30 is disposed external to the apparatus 10. The yoke 34, as part of a gimbal ring 36 assembly, or alone, can be mounted in the channel to a plate with the lamp 28 socket part of the gimbal ring 36 assembly, as is well known in the art. If so desired, the plates can have a plurality of holes 22, with each of the respective holes 22 aligning with corresponding holes 22 of an adjacent plate when the plates are welded together to form the plurality of channels for a plurality of lamps 28.

The plates can be made of metal (steel, stainless steel, aluminum silver, gold), plastics (acrylic, polycarbonate), glass (laminated, tempered, water white), onyx, travertine, stone, ceramic) or synthetic. There can be as many plates as desired and reasonable. The plates can have a shape which is square, round, rhombohedron, rectangular, octagonal, elliptical or oval. The length of the apparatus 10 can be made as long as desirable and reasonable. There can be just one lamp 28 in one channel, or there can be 10 lamps 28 in 10 distinct channels that extend across the ceiling 14, if it is desired.

Figure 7:
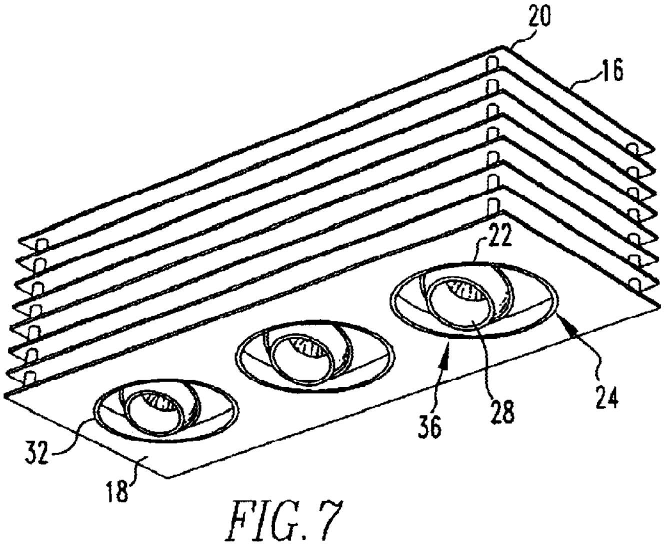
FIG. 7 is a schematic representation of a three lamp rectangular apparatus of the present invention.
Figure 8:
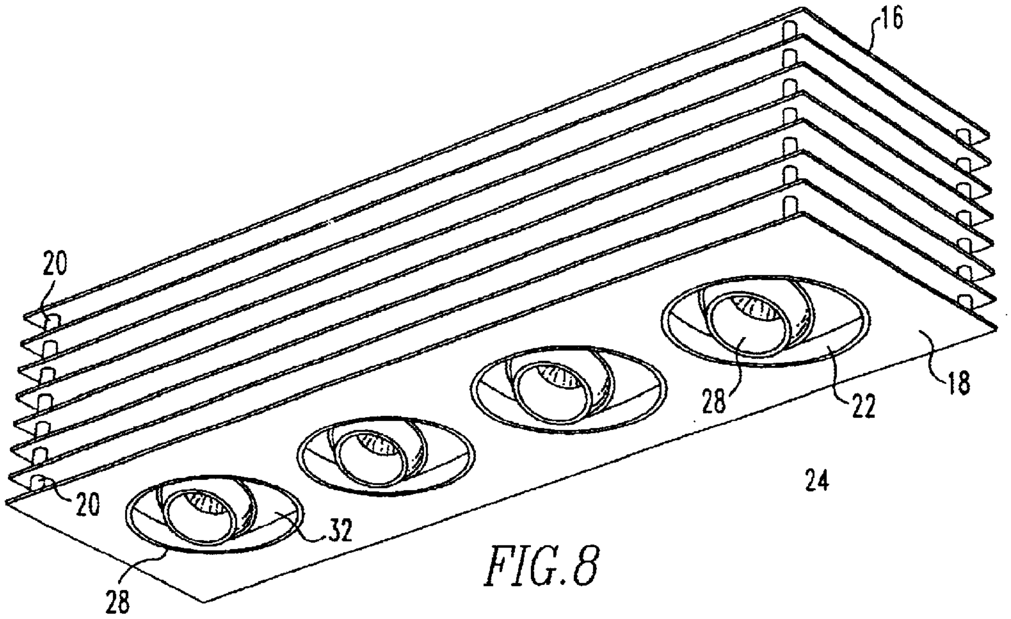
FIG. 8 is a schematic representation of a four lamp rectangular apparatus of the present invention.
Figure 9:
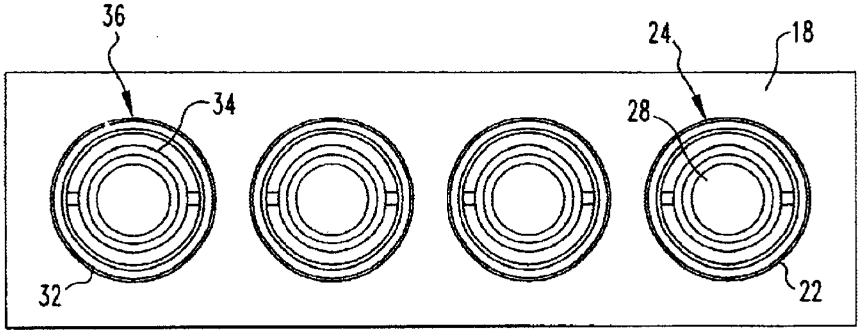
FIG. 9 is a schematic representation of a bottom view of the three lamp rectangular apparatus of the present invention.
Figure 10:
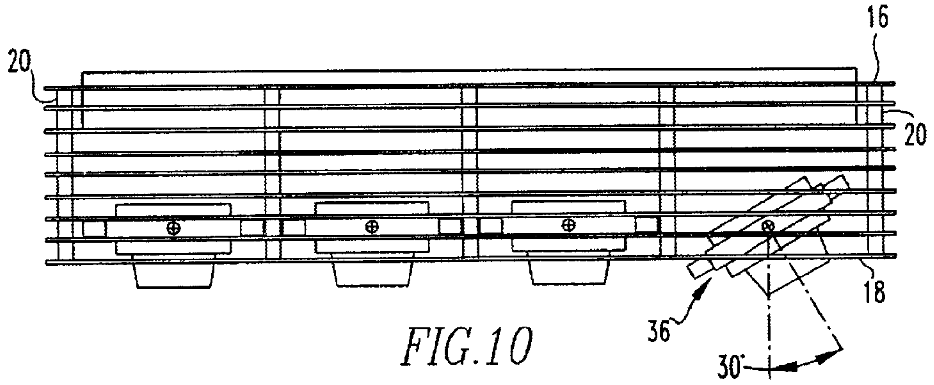
FIG. 10 is a schematic representation of a side view of the three lamp rectangular apparatus of the present invention.
Figure 11:
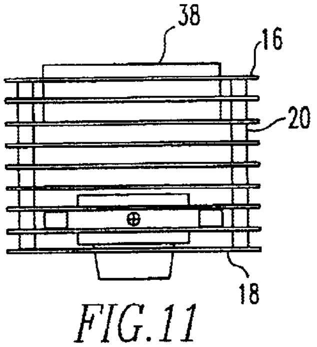
FIG. 11 is a schematic representation of a front view of the three lamp rectangular apparatus of the present invention.
Figure 12:
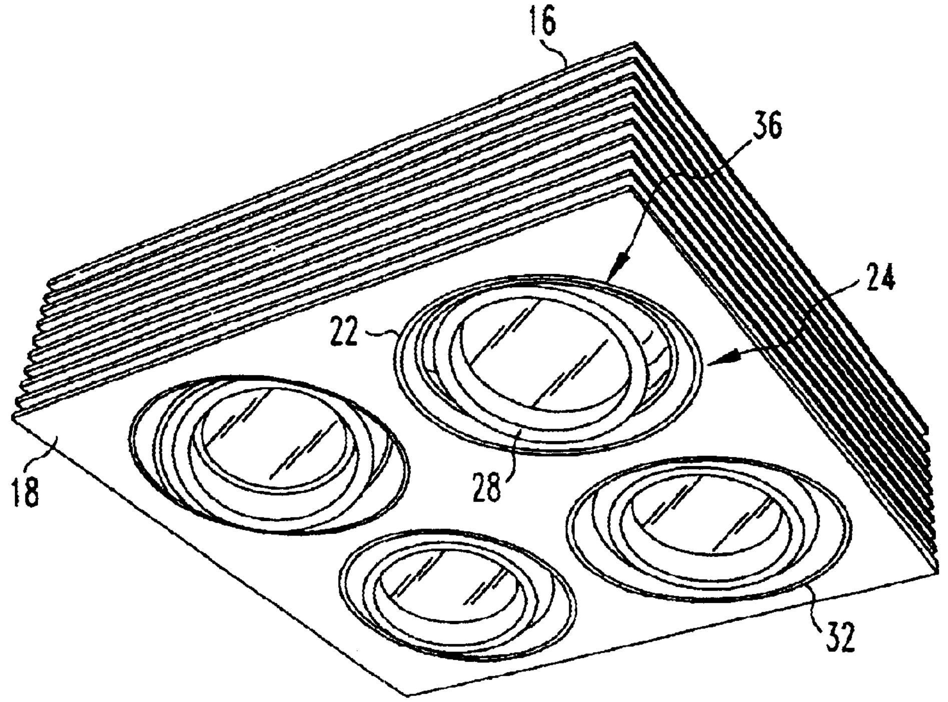
FIG. 12 is a schematic representation of a four lamp square apparatus of the present invention.

FIG. 7 is a three lamp rectangular apparatus. FIGS. 8–11 show a four lamp rectangular apparatus. FIG. 12 is a four lamp square apparatus.

The plates can have any increment of space between them that is desirable and reasonable. The plates can be separated by spacers 20 or magnets. The spacer 20 can be hollow or solid. The spacer 20 can be threaded or smooth. The spacer 20 can be made out of aluminum, steel, stainless steel, silver, gold, plastic, wood, ceramic or marble. The apparatus 10 can be surface mounted, suspended, semi-recessed, recessed, wall mounted or pendant mounted into the structure that supports it. The lamps 28 can be flush with the bottom plate, regressed above the bottom plate, or protruding below the bottom plate.

The lamps 28 can be low voltage or line voltage lamps 28. The lamps 28 can be held by sockets, rings free-floating, yokes 34, Modupoints or other quick disconnect systems. The lamp 28 sockets can be candelabra based, intermediate based, medium based, mogul based or bayonet based. The lamps 28 can be contained in an eyeball-pull down bracket that permits vertical movement of the lamp 28, Marconi type or telescopic. The transformers 30 and/or gear for the lamps 28 can be integral, remote or contained in attached or detached adjacent housing. The ceiling 14 can be made of standard common building materials, such as gyp board or acoustical (exposed bar hangers or concealed bar hangers) plaster or metal pan.

The apparatus 10 can be used with the Linears product line offered by Modular International, Inc. and placed in coves, valances are troughs.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for lighting a room from the rooms ceiling comprising:

a first plate having a hole;

a spacer contacting the first plate;

at least a second plate having a hole contacting the spacer and maintained in spaced relationship from the first plate by the spacer, the opening of the first plate and the opening of the second plate together defining a first channel; and means for lighting including at least one lamp and one transformer electrically connected to the lamp, the lamp being either a low voltage or line voltage lamp, the lamp extending into the first channel, the first plate and the second plate each have a second hole which together define a second channel, and the lighting means includes a second lamp disposed in the second channel.

2. An apparatus as described in claim 1 wherein each plate is made of metal, plastic, glass, marble or synthetic.

3. An apparatus as described in claim 2 wherein each plate is square, round, rectangular, triangular, octagonal, elliptical or oval.

4. An apparatus as described in claim 3 wherein the spacer can be hollow or solid and made of metal, plastic, wood, marble or synthetic or be magnetic.

5. An apparatus as described in claim 4 wherein the lighting means includes a yoke which holds the lamp.

6. An apparatus as described in claim 5 wherein the lighting means includes a gimbal ring assembly having the yoke for holding the lamp.

7. An apparatus as described in claim 6 wherein the lamps are regressed, flush or protruding with respect to the second plate.

8. An apparatus as described in claim 1 wherein the first and second plates are surface mounted, suspended, semi-recessed, or recessed from the ceiling or wall mounted.

9. An apparatus as described in claim 8 wherein the transformer is integral or remote from the first plate.

10. An apparatus as described in claim 9 wherein the transformer is attached or detached adjacent the first plate.

11. An apparatus as described in claim 10 wherein the lighting means includes a lamp socket for holding the first lamp.

12. An apparatus as described in claim 11 wherein the lamp socket is candelabra based, intermediate based, medium based, mogel based or bayonet based.

13. An apparatus as described in claim 11 wherein the first lamp is contained in an eyeball-pull down bracket that permits vertical movement of the lamp.

14. A method for forming a lighting apparatus comprising the steps of:

contacting a spacer to a first plate with a hole;

contacting a second plate having a hole to the spacer to maintain the second plate in parallel and spaced relationship with the first plate so the holes of the first and second plates form a first channel; and connecting a lamp socket adjacent the first plate to a transformer adjacent to a canopy for either a low voltage or a line voltage lamp.

15. A method for lighting a room comprising the steps of:

attaching a plurality of plates in spaced relationship and in parallel to each other, each plate having a hole, and the holes of the plurality of plates together defining a first channel, to a ceiling; and introducing a low voltage or a line voltage lamp into a lamp socket connected to a transformer adjacent the first plate so the lamp is disposed in the first channel.

16. A method as described in claim 15 wherein the attaching step includes the step of attaching a canopy to the ceiling, the plurality of plates attached to the canopy.

* * * * *